No. 828,959. PATENTED AUG. 21, 1906.
E. M. NOYER.
DRAFT ATTACHMENT FOR HARROWS.
APPLICATION FILED OCT. 5, 1905.
2 SHEETS—SHEET 1.
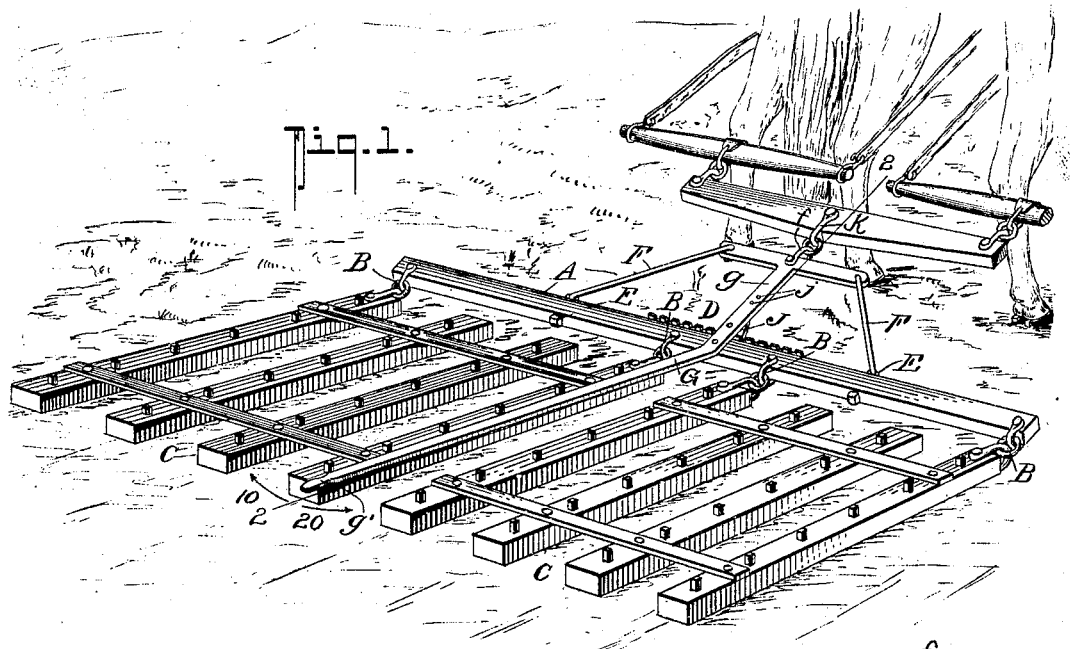
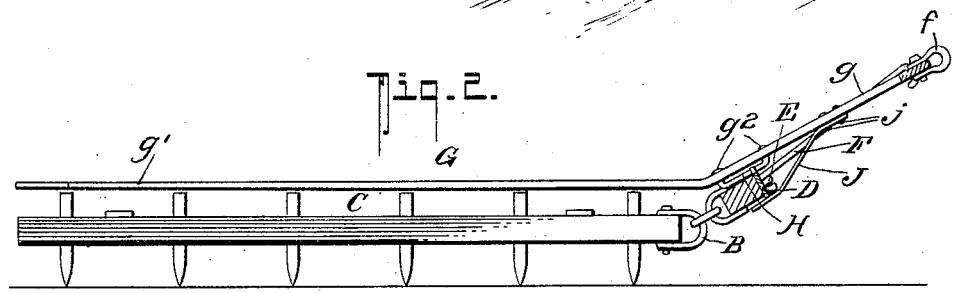
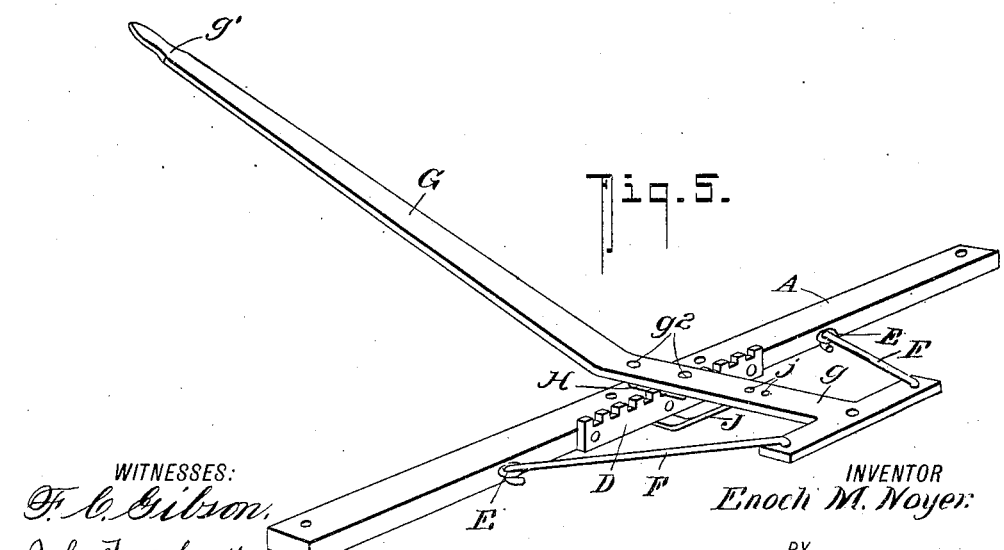
WITNESSES:
F. C. Gibson
John J. Schrott
INVENTOR
Enoch M. Noyer
BY
Fred G. Dieterich & Co.
ATTORNEYS No. 828,959. PATENTED AUG. 21, 1906.
E. M. NOYER.
DRAFT ATTACHMENT FOR HARROWS.
APPLICATION FILED OCT. 5, 1905.

2 SHEETS—SHEET 2.

WITNESSES:
F. C. Gibson.
John T. Schrott.

INVENTOR
Enoch M. Noyer.
BY
Fred G. Dieterich & Co.
ATTORNEYS

UNITED STATES PATENT OFFICE.

ENOCH M. NOYER, OF ALBION, WASHINGTON.

DRAFT ATTACHMENT FOR HARROWS.

No. 828,959.

Specification of Letters Patent.

Patented Aug. 21, 1906.

Application filed October 5, 1905. Serial No. 281,400½.

*To all whom it may concern:*

Be it known that I, ENOCH M. NOYER, residing at Albion, in the county of Whitman and State of Washington, have invented a new and Improved Draft Attachment for Harrows, of which the following is a specification.

My invention is in the nature of an improved construction of draft appliances or attachments for harrows, and especially designed to set the horse-eveners and harrow relatively to each other, whereby such different sets or adjustments of the harrow are quickly and positively accomplished to adapt the ordinary harrow or pulverizer to do good work on rolling ground, and particularly to cover all ground with the harrow-teeth without having the teeth following in direct line with each other when working "side hills" facing in a direction transverse to the direction of movement of the harrow.

My invention also has for its purpose to provide an attachment of the character stated of such simple construction and arrangement of parts that the same can be built without the aid of special tools or machinery other than the usual blacksmith-tools and which can be readily applied to any of the ordinary types of drag-harrows or pulverizers without modifying or changing their construction.

With the above objects in view my invention in its generic nature comprehends a draft connection having a special coöperative arrangement of a drag-bar adapted to be connected to the harrow-bars to sustain a uniform relation thereto, changeable link connections that join with the said bar and through a single pivotal connection with the horse-eveners, and a means sustained by the drag-bar, including a swinging lever that extends back over the harrow for shifting the position of drag-bar and the harrow relatively to the direction or line of draft.

In its more detailed nature my invention consists in certain novel features of construction and combination of parts, all of which will hereinafter be fully explained and illustrated in the accompanying drawings, in which—

Figure 3:
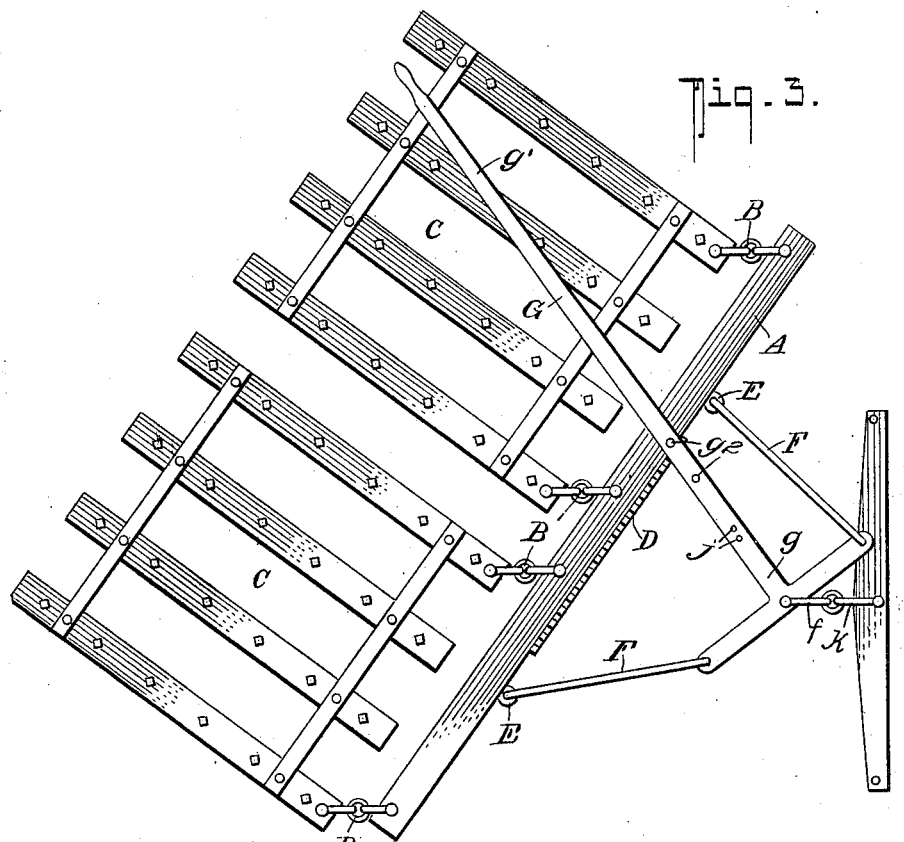
Figure 4:
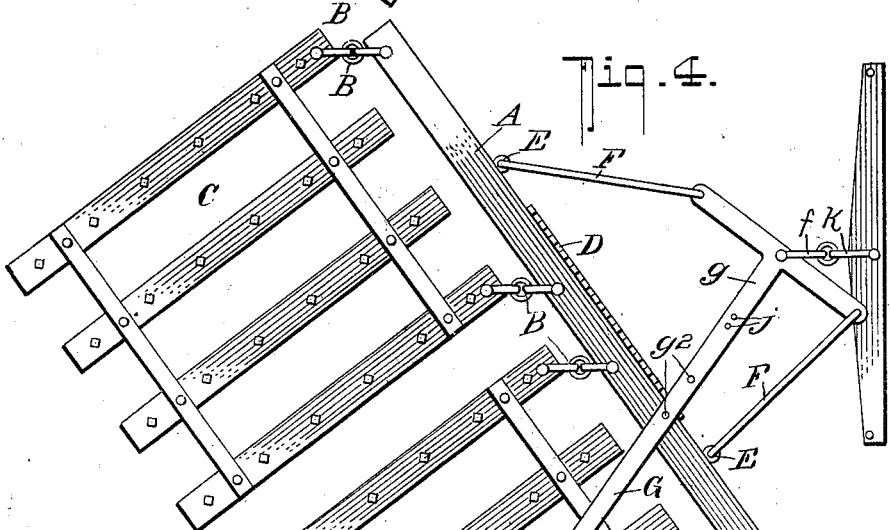

Figure 1 is a perspective view which illustrates my invention and shows the parts adjusted to draw the harrow in forward alinement with the direct line of draft. Fig. 2 is a longitudinal section thereof, taken on the line 2 2 on Fig. 1. Fig. 3 is a plan view showing the harrow adjusted at an angle to the left of the line of draft. Fig. 4 is a similar view showing the harrow adjusted at an angle to the right of the line of draft. Fig. 5 is a perspective view of the attachment disconnected from the harrow and the draft or evener beam.

In its practical arrangement my invention comprises a drag-bar A of a length equal that of the harrow member, to which it is attached by swivel connections B B, constructed to permit independent movement of the harrow or pulverizer frames C C, two of which are shown, but which may be in practice of a greater or less number, if desired.

Upon the front edge of the bar A, midway its length, is secured a rack-plate D, the purpose of which will presently appear, and at each end at points about midway the rack-plate D and the outer ends of said bar eye-bolts E E are secured to the said bar, to which the inner ends of the link-rods F F are connected.

G designates a lever-bar which comprises an inclined member $g$, the forward end of which terminates in a T portion, and a horizontal handle portion $g'$, that extends back over the harrow-sections, as shown, whereby it can be conveniently grasped by the operator. The lever G has a slidable connection with the bar A, and for holding it to its shifted position on the said bar the said lever carries a bail H, secured to the inclined portion of the lever G, as at $g^2$, in such manner that it engages with the rack D to hold the lever G to either of the adjustments shown in Figs. 1, 2, and 3 of the drawings, and to provide for a proper engagement of the lever G with the bar said lever G has a stout spring clip or detent J, secured to the under side by the bolts or rivets $jj$ in such manner that the free end of the clip engages the under side of the bar A, as clearly shown in Fig. 2.

The ends of the cross or T head of the lever are pivotally joined to the outer ends of the link-rods F, and the said cross-head has a clevis $f$, that swivelly engages the bail-piece K, centrally secured to the rear edge of the horse-evener beam, which carries at the ends the usual swingletrees, to which the team is attached in the usual manner.

From the foregoing, taken in connection with the accompanying drawings, the complete arrangement and the advantages of my invention are thought to be readily apparent.

It will be noticed that by reason of the peculiar coöperative combination of the several parts as described and shown by shifting the lever G to a point midway of and at right angles to the bar A the harrow or drag frame will be held in parallel with the horse-evener bar and in the direct line of draft, as shown in Fig. 1.

By shifting the lever in the direction indicated by arrow 10 on Fig. 1 to the position shown in Fig. 3 the harrow frame or frames will be located at the left of the direct line of draft at an angle thereto and in such manner to keep the harrow-teeth from following each other and to cause them to cover all the ground and in condition to positively pulverize all the ground—for example, on a sidehill that faces in a direction transverse to the line of draft—it being manifest that by shifting the lever G over in the direction indicated by arrow 20 in Fig. 1 to the position shown in Fig. 4 the same results are obtained, except in the latter adjustment the angle of the harrow-frame is reverse to that shown in Fig. 3, and in each adjustment the lever will be held to its set position by reason of the bail H thereon engaging the rack-teeth.

It will also be noticed from the foregoing and a review of the drawings that the several parts are of such form that they can be easily shaped by the ordinary blacksmith and set up for use in connection with any of the ordinary types of harrow or pulverizer frames, and while I have shown the same arranged to coact with a pair of harrow-frames they can readily be designed to take one harrow-frame or three or more frames, if desired.

Having thus described my invention, what I claim, and desire to secure by Letters Patent, is—

1. An attachment of the character described, comprising a drag-bar adapted to be swivelly connected to the harrow frame or frames, a horse-evener bar, link-and-clevis connections joining said evener-bar with the drag-bar, and means mounted on the drag-bar and joined to said link connections for shifting said link connections to bring the drag-bar and the harrow frame or frames connected thereto, at different angles with respect to the horse-evener bar and the direct line of draft as set forth.

2. In combination with a horse-evener bar, and a harrow or pulverizer frame; of a drag-bar pivotally connected to the harrow-frame, convergingly-disposed link-rods connected to the front end of the drag-bar, a lever pivotally connected to the horse evener-bar and to the converged ends of the link-rods, said lever having slide movement on the drag-bar and extended rearwardly thereof over the harrow-frame, and means for interlocking the said lever with the drag-bar to hold the said lever to its shifted position on the drag-bar for the purpose described.

3. In combination with a harrow and a horse-evener bar; of means for connecting said harrow with the horse-evener bar, said means comprising adjustable devices connected to the bar and harrow, adapted, under one adjustment to hold the harrow in the direct line of draft, and under other adjustment at angles to said direct line of draft, and detent devices for holding the harrow to the several adjustments stated.

4. The combination with the harrow or pulverizer frame and the draft or evener bar; of the drag-bar pivotally connected to the harrow-frame, having a rack portion on its front face midway its length, a lever member disposed transversely of the drag-bar, having its outer end terminated in a T-head and its rear end formed into a handle portion, a swivel connection that joins the T-head with the evener-bar, a pair of link-rods that have their outer ends pivotally connected to the ends of the T-head of the lever, and their inner ends diverged and swivelly connected to the drag-bar, a detent on the lever for engaging the rack portion on the drag-bar and means for holding the lever in contact with the top of the drag-bar as the said lever is shifted laterally on said bar as set forth.

ENOCH M. NOYER.

Witnesses:
  J. W. MILLER,
  GEO. PRIESTER.